US008840085B2

(12) United States Patent
Choo et al.

(10) Patent No.: US 8,840,085 B2
(45) Date of Patent: Sep. 23, 2014

(54) MULTI-SEAL KNIFE GATE VALVE

(75) Inventors: Yeon Chil Choo, Busan (KR); Jae Hun Baek, Busan (KR)

(73) Assignee: Hifly Valve Co., Ltd, Busan (KR)

( * ) Notice: Subject to any disclaimer, the term of this patent is extended or adjusted under 35 U.S.C. 154(b) by 132 days.

(21) Appl. No.: 13/509,143

(22) PCT Filed: Feb. 24, 2011

(86) PCT No.: PCT/KR2011/001287
§ 371 (c)(1),
(2), (4) Date: May 10, 2012

(87) PCT Pub. No.: WO2011/105824
PCT Pub. Date: Sep. 1, 2011

(65) Prior Publication Data
US 2013/0026407 A1    Jan. 31, 2013

(30) Foreign Application Priority Data
Feb. 26, 2010  (KR) .................. 10-2010-0018077

(51) Int. Cl.
*F16K 3/00*   (2006.01)
*F16K 3/02*   (2006.01)
(52) U.S. Cl.
CPC ............ *F16K 3/0281* (2013.01); *F16K 3/0227* (2013.01)
USPC ........... 251/203; 251/328; 251/329; 251/332; 277/650
(58) Field of Classification Search
USPC .................. 251/203, 328–329, 332; 277/650
See application file for complete search history.

(56) References Cited

U.S. PATENT DOCUMENTS

| 2,064,567 | A | * | 12/1936 | Riley | 251/328 |
| 3,207,471 | A | * | 9/1965 | Williams | 251/328 |
| 3,273,855 | A | * | 9/1966 | Wells | 251/328 |
| 3,301,523 | A | * | 1/1967 | Lowrey | 251/332 |
| 3,307,826 | A | * | 3/1967 | Lowrey | 251/328 |
| 4,163,544 | A | * | 8/1979 | Fowler et al. | 251/328 |
| 4,201,365 | A | * | 5/1980 | Paptzun et al. | 251/328 |
| 4,377,274 | A | * | 3/1983 | Mayhew, Jr. | 251/327 |
| 4,534,540 | A | * | 8/1985 | Bragin et al. | 251/203 |
| 4,603,864 | A | * | 8/1986 | Raftis | 251/333 |
| 5,082,247 | A | * | 1/1992 | Owens et al. | 251/326 |
| 7,163,191 | B2 | * | 1/2007 | Young et al. | 251/203 |
| 2004/0124393 | A1 | * | 7/2004 | Shimomura | 251/332 |

FOREIGN PATENT DOCUMENTS

| JP | 59-137463 A | 9/1984 |
| JP | 2004-124978 A | 4/2004 |
| KR | 20-0248702 Y1 | 11/2001 |

OTHER PUBLICATIONS

International Search Report for PCT/KR2011/001287.

* cited by examiner

*Primary Examiner* — John Bastianelli
(74) *Attorney, Agent, or Firm* — The PL Law Group, PLLC

(57) ABSTRACT

A multi-seal knife gate valve includes: a valve body coupled to a pipe; a disk inserted into the valve body to move vertically; and a valve seat pressed against the disk so as to maintain a tight seal, wherein the disk installed in the valve body moves vertically to open or close a passage through which fluid flows, and the valve seat is pressed against the disk and includes at least one metal seat and one rubber seat to maintain a seal.

6 Claims, 9 Drawing Sheets

PRIOR ART

PRIOR ART

PRIOR ART

PRIOR ART

PRIOR ART

MULTI-SEAL KNIFE GATE VALVE

CROSS REFERENCE TO RELATED APPLICATIONS AND CLAIM OF PRIORITY

This patent application is a National Phase application under 35 U.S.C. §371 of International Application No. PCT/KR2011/001287, filed on Feb. 24, 2011, entitled MULTI-SEAL KNIFE GATE VALVE, which claims priority to Korean Patent Application number 10-2010-0018077, filed on Feb. 26, 2010, entire contents of which are incorporated herein by reference.

BACKGROUND

1. Technical Field

The present invention relates, in general, to a knife gate valve and, more particularly, to a multi-seal knife gate valve having improved durability and sealing capability.

2. Description of the Related Art

Generally, tubing systems requiring flow control use valves. Such valves are usually equipped with knife valves in order to control high viscosity fluid and the powders and solid granules to be carried. That is, such fluids impede the opening and shutting of a valve because of their clogging, friction, etc. and so a seat like disk is essentially used to be moved forward as if it cut the fluids, in order to open and shut the valve.

An existing knife gate valve uses a metal seat or a rubber seat according to the type of fluid and the purpose of use. However, while metal seat type knife gate valves are usually used in locations that require durability, the valves have poor sealing capability so that leakage often occurs. In the meantime, while the rubber seat type knife gate valves are used in a pipe that requires high sealing capability, the valves have poor durability to cause the problems of maintenance to occur.

That is, existing knife gate valves are of the metal seat type and the rubber seat type. However, since the metal seat type valves have excellent durability but poor sealing capability because their metal-to-metal contact structures make it difficult to maintain complete airtightness, the problems are that the valves cannot be used in pipes requiring high sealing capability. Further, while the rubber seat type knife gate valves are used in pipes requiring high sealing capability, the valves have poor durability so that there are the problems of maintenance.

The structures and problems of the existing knife gate valves that are of the type that uses the rubber seats will be described with reference to FIGS. 1 to 5.

Referring first to FIGS. 1 to 3, a first structure of the knife gate valve is a valve which is connected between pipes to open and close the flow of fluid, and which includes a valve body 10 coupled with a pipe (not shown), a disk 20 inserted into the valve body 10 so as to move vertically, and a rubber seat 30a coming into close contact with the disk 20 to maintain the airtightness.

In the knife gate valve shown in FIGS. 1 to 3, the rubber seat 30a is mounted in the inside of the valve body in such a manner as to surround the inside from the bottom up to the top of opposite sides of the inside that extend from the bottom.

While this structure can perform complete sealing, there are drawbacks of poor durability due to severe friction because when the valve is opened and closed, the rubber seat 30a comes into simultaneous contact with opposite sides of the valve disk 20. In addition, since the rubber seat 30a extends up to the upper portion of the inside of the valve body 10, there are the problems of leakage occurring at the upper portion of the valve.

Further, a seat groove is formed in the bottom of the inside of the valve body 10 to prevent the seat from being detached therefrom, so that if foreign matter gathers in the seat groove, malfunction and leakage may occur.

In the meantime, a second structure of the knife gate valve will be described with reference to FIGS. 4 and 5. This knife gate valve is also a valve that is connected between pipes to open and close the flow of fluid. The valve also includes a valve body 10 coupled with a pipe, a disk 20 inserted into the valve body 10 to move vertically, and a rubber seat 30b coming into close contact with the disk 20 to maintain airtightness. However, the shape of the rubber seat 30b is different from that of the former rubber seat.

That is, the rubber seat 30b shown in FIGS. 4 and 5 is a ring type seat including two seat parts which are inserted and assembled into a flow passage of the valve body 10 in opposite directions. That is, the type of the seat is such that the seat penetrates into and surrounds the passage of the valve from the outside.

In this case, the rubber seat 30b comes into contact with opposite major surfaces of the disk 20, so that when the valve is opened and closed, the rubber seat 30b is required to be close to the disk 20 without being detached therefrom. To this end, the rubber seat 30b is fabricated into a special form by inserting a metallic support into the rubber seat, which makes it costly and difficult to fabricate.

Further, since the rubber seat 30b comes into contact with the opposite surfaces of the disk 20, the problem of poor durability arises because of severe friction occurring when the valve is opened and closed.

Further, because of the severe friction, the valve needs a great amount of actuation torque and therefore a huge driver for the actuation of the valve, problematically increasing the cost.

SUMMARY

Accordingly, the present invention has been made keeping in mind the above problems occurring in the related art, and an object of the present invention is to provide a multi-seal-type knife gate valve having good sealing capability and excellent durability which compensates for the drawbacks of metal-seat-type knife gate valves having excellent durability but poor sealing capability, and of rubber-seat-type knife gate valves having good sealing capability but poor durability, and retains the strengths of the two valve types.

In an aspect, an embodiment of the present invention provides a multi-seal knife gate valve which includes: a valve body coupled with a pipe; a disk inserted into the valve body to move vertically; and a valve seat pressed against the disk so as to maintain a tight seal, wherein the disk installed in the valve body moves vertically to open or close a passage through which fluid flows, and the valve seat is pressed against the disk and has at least one metal seat and one rubber seat to maintain a seal.

As described above, the knife gate valve according to the embodiment of the present invention has improved durability and sealing capability, so that there are the effects of reducing frequent repairs and thus the maintenance cost and of preventing shutdowns, production delays, etc. due to an interruption in the operation of a valve.

Further, the knife gate valve has improved sealing capability, so that the intrusion of foreign matters into a product is prevented, contributing to improving the quality of a product and reducing product defectiveness.

Particularly, while the problems with existing valves are high cost and the valve having to be precisely selected depending on the importance of the durability or sealing capability to satisfy the purpose of use, advantages of the knife gate valve of the present invention are that satisfactory performance is obtained for both the durability and sealing capability and that the rubber seat can be easily replaced by a new one, providing outstanding effects of competitive power on the cost and of wide adaptability of being used in a variety of pipes.

DETAILED DESCRIPTION

Hereinbelow, preferred embodiments of the present invention will be described in detail with reference to FIGS. 6 to 11.

Figure 1:
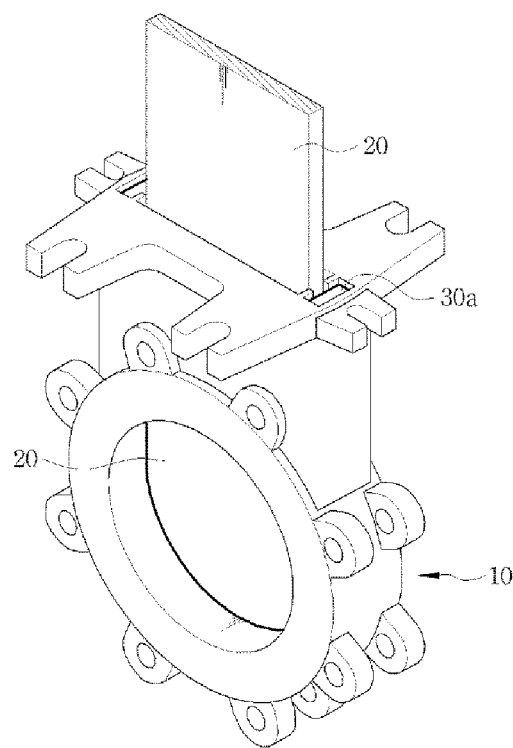
FIG. 1 is a perspective view of an exemplary structure of an existing knife gate valve.
Figure 2:
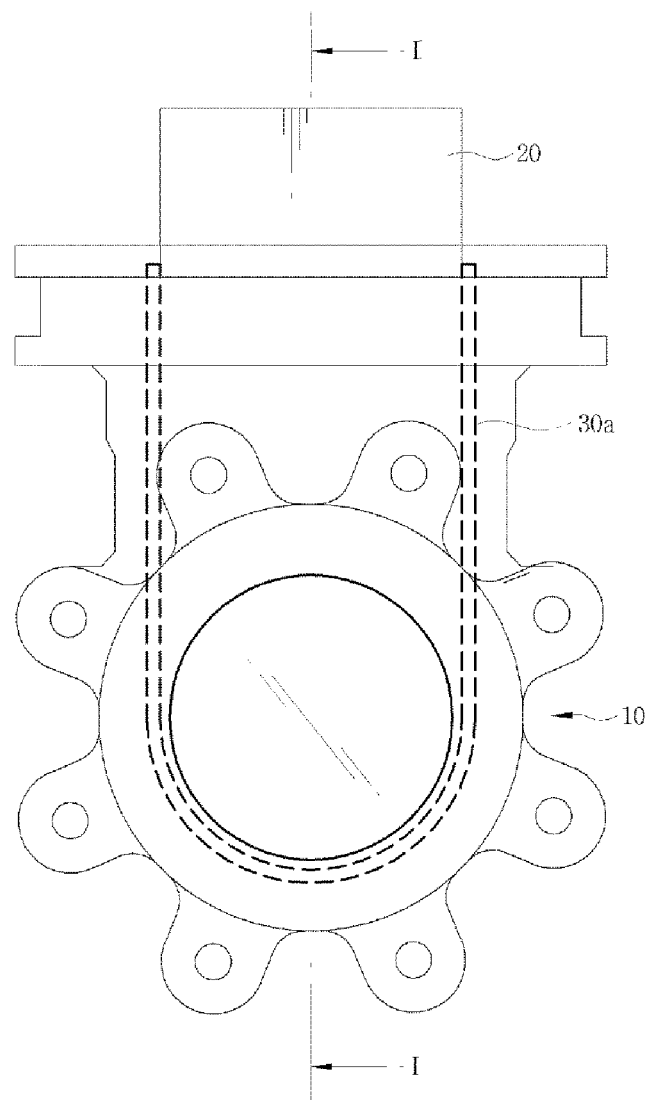
FIG. 2 is a front view of the structure of the knife gate valve.
Figure 3:
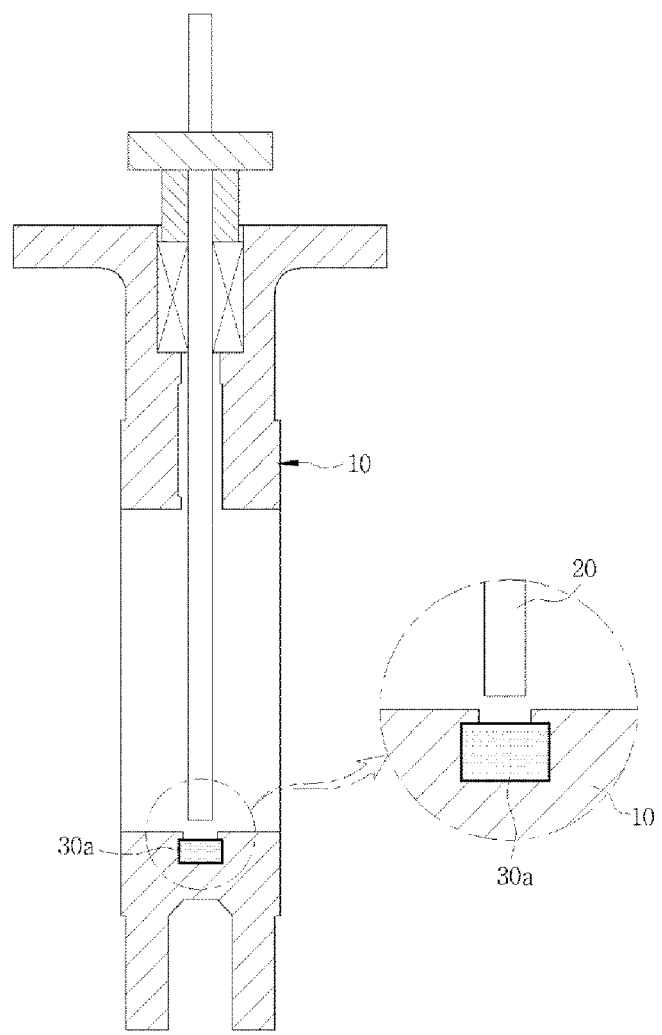
FIG. 3 is a cross-sectional view taken along line I-I of FIG. 2.
Figure 4:
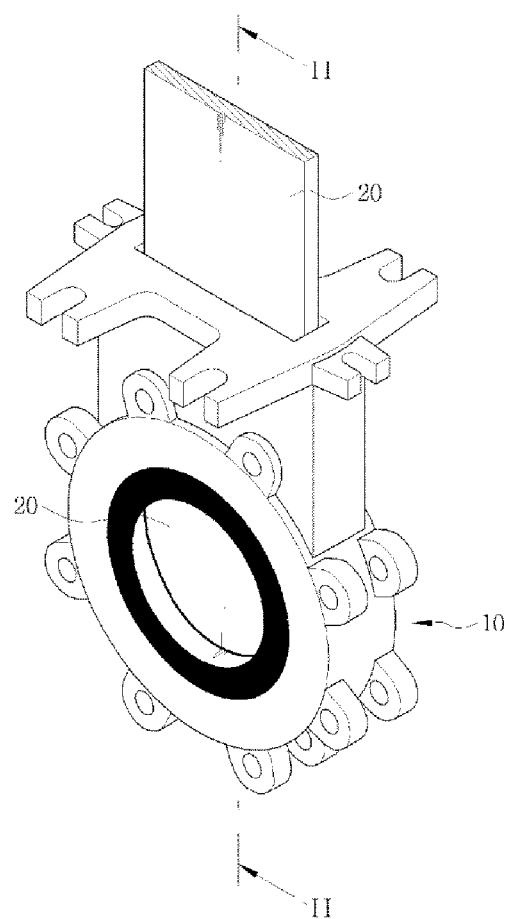
FIG. 4 is a perspective view of another exemplary structure of an existing knife gate valve.
Figure 5:
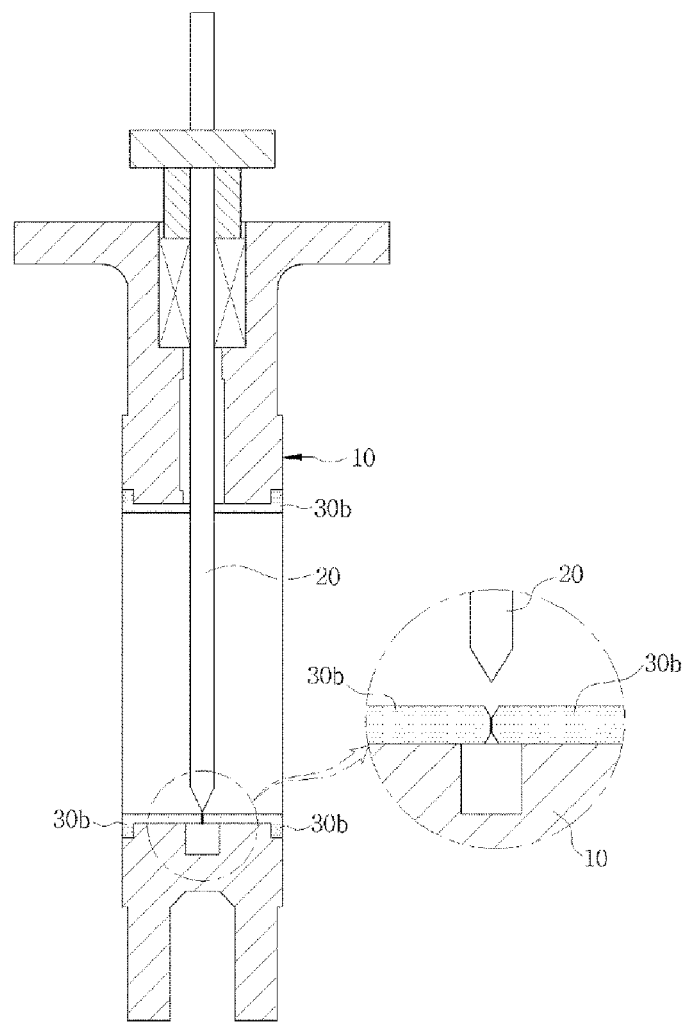
FIG. 5 is a cross-sectional view taken along line II-II of FIG. 4.
Figure 6:
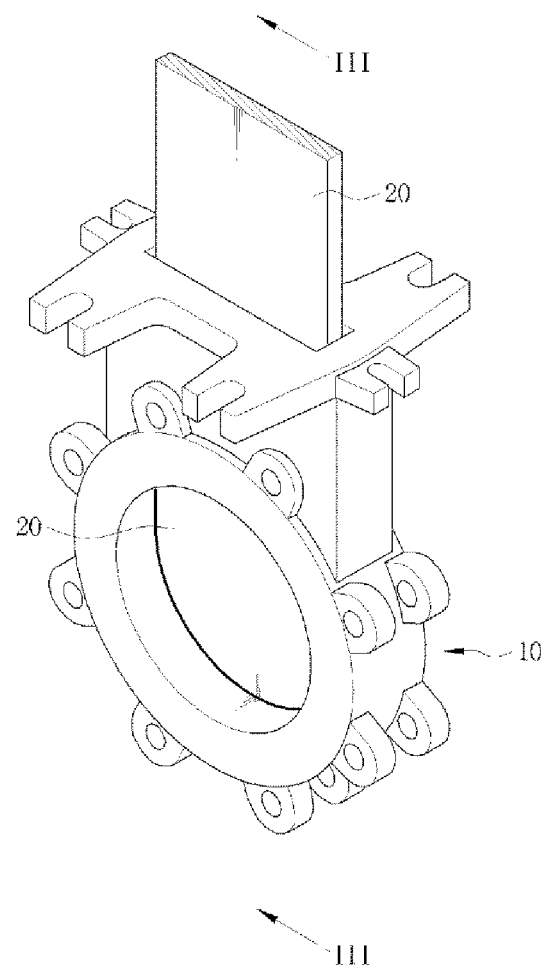
FIG. 6 is a perspective view of a knife gate valve according to the present invention.
Figure 7:
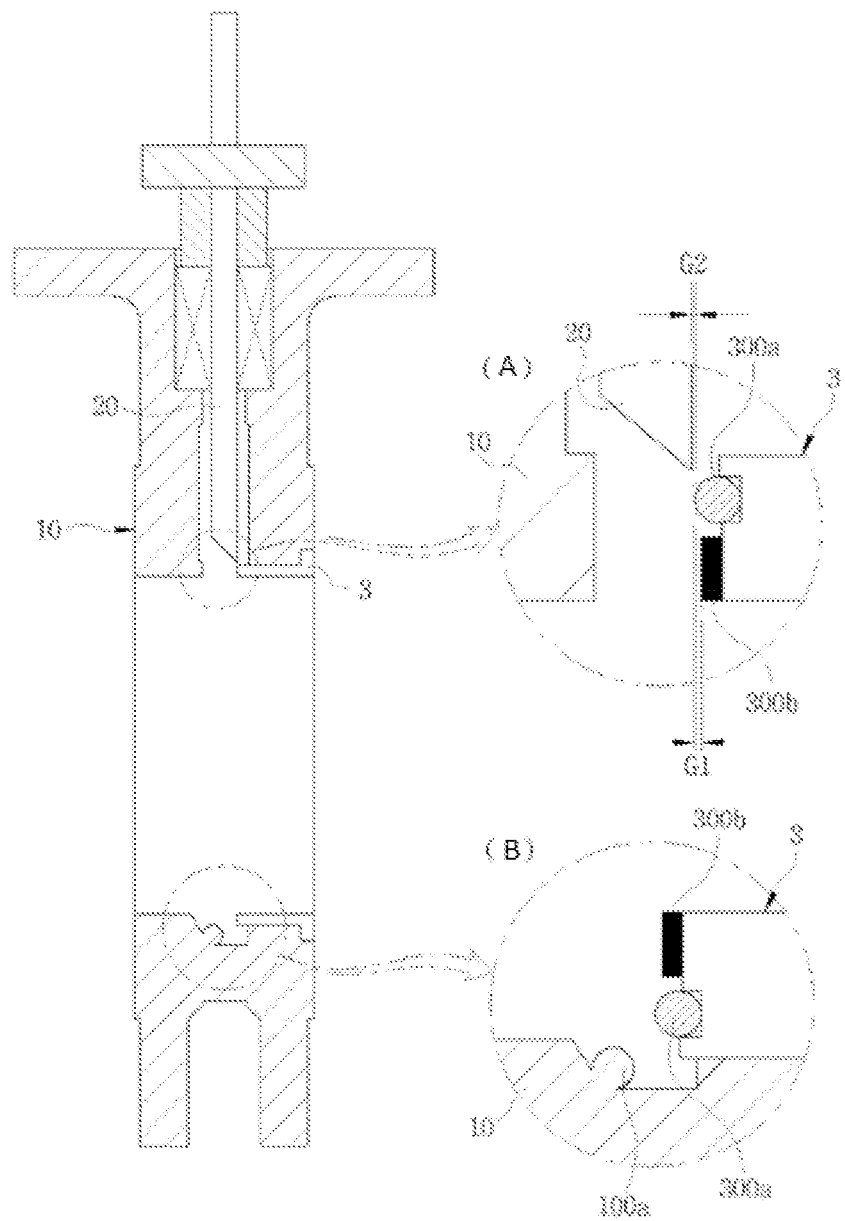
FIG. 7 is a cross-sectional view taken along line III-III of FIG. 6, showing the open state of a passage of a pipe before a disk is not moved down.
Figure 8:
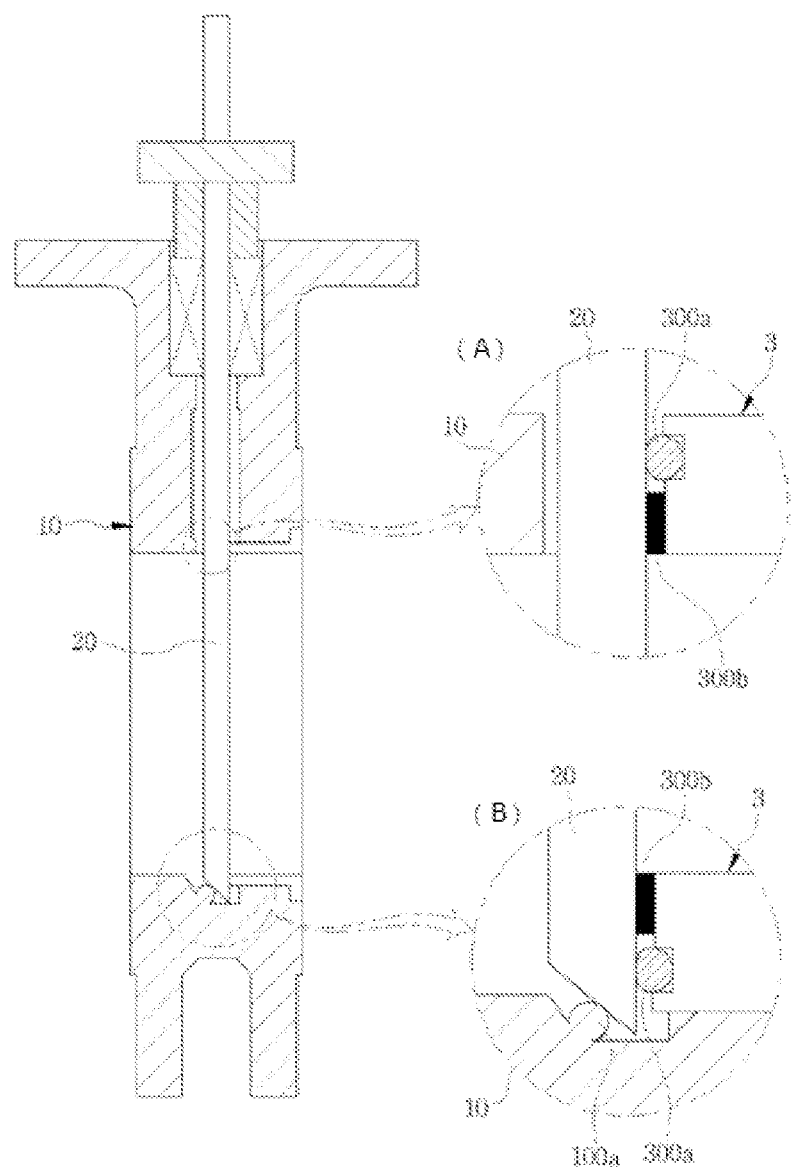
FIG. 8 is a cross-sectional view taken along line III-III of FIG. 6, showing the closed state of the passage of the pipe before a disk has been moved down.
Figure 9:
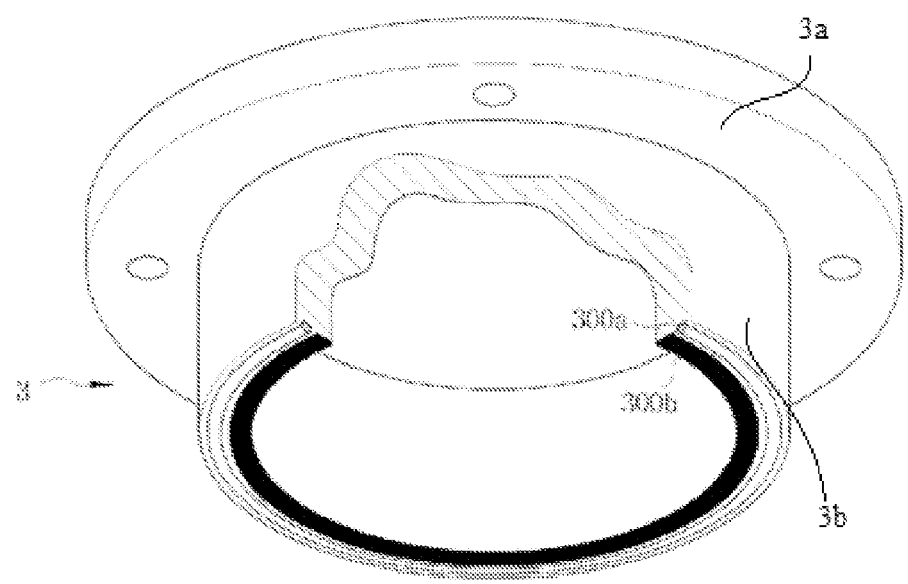
FIG. 9 is a perspective view of a seat ring of FIG. 6.

FIG. 6 is a perspective view of a knife gate valve according to an embodiment of the present invention, FIG. 7 is a cross-sectional view taken along line III-III of FIG. 6, showing the open state of a passage of a pipe before a disk is not moved down, FIG. 8 is a cross-sectional view taken along line III-III of FIG. 6, showing the closed state of the passage of the pipe before a disk has been moved down, and FIG. 9 is a perspective view of a seat ring of FIG. 6.

Referring to these drawings, the knife gate valve of the embodiment of the invention includes a valve body 10 to be coupled with a pipe (not shown), a disk 20 inserted into the valve body 10 to move vertically, and a valve seat pressed against the disk 20 so as to maintain a tight seal, wherein the valve seat is pressed against the disk 20 and has at least one rubber seat 300a and one metal seat 300b to maintain a seal.

Here, the rubber seat 300a and the metal seat 300b are installed particularly in the side opposite to the surface of the disk 20 that is brought into contact with a stopper 100a when the disk is moved down, such that they are pressed against that surface of the disk 20 to maintain a seal.

Specifically, the rubber seat 300a and the metal seat 300b are installed in one side of a seat ring 3 which includes a cylindrical body 3a and a radial flange 3b at the other side.

The rubber seat 300a is configured such that when the rubber seat 300a and the metal seat 300b have been installed to the seat ring 3, it is protruded further towards the disk 20 by a certain gap G1 relative to the metal seat 300b, being of an O-ring structure.

In the meantime, a stopper 100a is provided on a disk recess that is provided at the bottom of the inside of the valve body 10 in order to allow the moving-down disk 20 to be stopped and concurrently press the disk 20 against the valve seat. In the state of the disk 20 not being in contact with the stopper 100a, the rubber seat 300a is installed such that it is spaced apart from the disk 20 by a distance G2.

The operation of the knife gate valve is as follows.

The knife gate valve (also referred as a 'metal seat valve') equipped with an existing metal seat has the drawbacks of poor sealing capability, and the knife gate valve (also referred to as a 'rubber seat valve') equipped with an existing rubber seat also has the drawbacks of poor durability.

That is, in the existing metal seat valve, when the fluid flows through a pipe with a strong flow, the fluid can includes the surface of the a disk, thereby forming a seal within an allowable reference, whereas when the fluid flows slow through a pipe, the fluid cannot sufficiently compress the surface of a disk, resulting in a gap between the metal seat and the disk so that excessive leakage occurs through the gap, degrading the function of a valve, which causes various problems in the industrial field.

Further, in the existing knife gate valve equipped with the rubber seat, while the rubber seat is installed such that it can be pressed against opposite main surfaces or sides of the disk 20 so that excellent sealing capability can be secured under both high and low pressure, when the disk 20 is opened and closed, by nature the rubber seat creates a high friction force, being subjected to an elastic deformation and therefore easy breakage, thereby requiring frequent maintenance work.

On the contrary, according to the knife gate valve of an embodiment of the present invention, when the fluid flows through a pipe, the disk 20 is successively brought into contact with the rubber seat and the metal seat 300b, maintaining high sealing capability, thereby compensating for the drawbacks of the existing metal seat valve.

That is, the structure of the knife gate valve of the invention is such that the rubber seat 300a is extended a further distance relative to the metal seat 300b so that the elastic range of the rubber seat 300a is defined by the metal seat 300b. Thereby, at high pressure of fluid, the disk 20 comes into contact first with the rubber seat 300a and second with the metal seat 300b.

Thus, the rubber seat 300a is always deformed in the elastic range G1 so as to increase the durability of the rubber seat 300a. Further, at low pressure of fluid, the disk 20 comes into contact with the rubber seat 300a, which further extends by a distance G1 towards the disk 20 relative to the metal seat 300b, so as to maintain a seal, so that excellent sealing capability can be secured even under low pressure flow.

In the meantime, the existing rubber seat valve has the drawbacks of poor durability because when the disk 20 (FIGS. 1 to 5) is either moving or stopped, the rubber seat is always pressed against the disk 20 to cause severe friction to occur therewith, so that it deforms easily and the durability is reduced.

However, the knife gate valve of the invention is operated such that when the disk has not yet moved down as shown in FIG. 7, the rubber seat 300a remains spaced apart by a distance G2 from the disk 20, and when the rubber seat 300a has moved down as shown in FIG. 8, the disk is pushed out by interaction between the stopper 100a and an inclined plane of the disk, so that the rubber seat 300a is brought into contact with the disk 20 while being deformed in the elastic range G1 that is defined by the metal seat 300b, thereby considerably increasing the durability of the rubber seat 300a.

That is, according to the knife gate valve of the invention, when the disk 20 is moved down, the inclined plane of the disk comes into contact with the stopper 100a so that the disk 20 is pushed to the outside by a distance G1+G2, so that the rubber seat 300a is pressed against the disk 20 while being deformed in the elastic range defined by the metal seat 300b, thereby effectively maintaining the sealing capability as well as durability.

Further, in the existing knife gate valve, if solid foreign substances such as metal pieces, sand, stone powder, etc. are introduced into a pipe, they directly collide with the metal seat to deform it. However, in the knife gate valve of the invention, the rubber seat 300a first comes into contact with the foreign substances so as to bounce them, so that the foreign substances cannot be brought into direct contact with the metal seat 300, which further increases the durability.

In the meantime, the knife gate valve of the invention is a valve that is capable of employing a variety of kinds of seats which are mounted thereto using a mounting groove or by welding, plating or the like, according to the size and kind (rubber or metal) of the seat. For example, the metal seat 300b shown in FIGS. 7 and 8 is provided by welding, plating or the like, and the rubber seat 300a is mounted in a mounting groove in the form of an O-ring.

As described before, the knife gate valve of the invention is of a multi-seal type that has excellent sealing capability and durability, so that there is the effect of solving the problems of the related art wherein the existing valve has to be precisely selected depending on the importance of the durability or sealing capability to satisfy the purpose of use, and the effect of the O-ring type rubber seat being easy to replace with a new one, providing outstanding effects of competitive power in terms of cost and of wide adaptability to use in a variety of pipes.

As described above, the knife gate valve according to the present invention has satisfactory performance for both durability and sealing capability compared to the existing valve, and also competitive power in terms of cost because of the rubber seat being easy to replace with a new one.

It should also be understood that the embodiments of the present invention may be changed to a variety of embodiments and that the scope and spirit of the present invention are not limited to the embodiment described above. For example, it is natural that depending on the fluid used and the purpose of use, the position of the rubber seat 300a and the metal seat 300b can be reversed, and a variety of kinds of metal seat and rubber seats can be properly combined and adapted in a dual or more structure.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A multi-seal knife gate valve coupled with a pipe, consisting of:
   a valve body coupled with the pipe in which the fluid flows, the valve body having a disk recess at the bottom of an inside of the valve body;
   a disk inserted into the valve body to move vertically to open or close a passage through which fluid flows, wherein the disk is positioned in the disk recess when the disk moves to the bottom of the valve body;
   a valve seat pressed against the disk so as to maintain a tight seal, the valve seat comprising a metal seat and a rubber seat to maintain the tight seal;
   a seat ring comprising a cylindrical body at one side and a radial flange at the other side, wherein the rubber seat and the metal seat are installed on the end of the one side of the seat ring; and
   a stopper provided on the disk recess in order to allow the vertically-moving disk to be stopped at the disk recess and concurrently press the disk against the valve seat, wherein in the state of the disk not being in contact with the stopper, the rubber seat is installed such that the rubber seat is spaced apart from the disk by a distance, wherein the disk, the rubber seat and the metal seat are positioned in a way that the flow of the fluid presses the disk toward the rubber seat when the disk closes the passage.

2. The multi-seal knife gate valve according to claim 1, wherein the rubber seat is an O-ring.

3. The multi-seal knife gate valve according to claim 1, wherein the rubber seat is further protruded towards the disk relative to the metal seat.

4. A multi-seal knife gate valve coupled with a pipe, consisting of:
   a valve body coupled with the pipe in which fluid flows;
   a disk inserted into the valve body to move vertically;
   a seat ring coupled with the valve body, the seat ring comprising a cylindrical body and a radial flange extended outward from only one end of the cylindrical body, the cylindrical body having an opening through which the fluid flows and a ring-shaped surface facing the disk in a state of the disk closing the opening of the cylindrical body at the other end of the cylindrical body;
   a metal seat installed on the ring-shaped surface of the other end of the cylindrical body so that the metal seat is further protruded towards the disk relative to the cylindrical body of the seat ring, the metal seat being in contact with the disk when the disk closes a passage through which the fluid flows;
   a rubber seat installed on the ring-shaped surface, the rubber seat spaced apart from the metal seat and having a ring shape larger than the metal seat, the rubber seat further protruded towards the disk relative to the metal seat, the rubber seat being in contact with the disk when the disk closes a passage through which the fluid flows; and
   a stopper provided on a disk recess that is provided at the bottom of the inside of the valve body in order to allow the vertically-moving disk to be stopped at the disk recess and concurrently press the disk against the metal seat and the rubber seat;
   wherein, in the state of the disk not being in contact with the stopper, the rubber seat is installed such that the rubber seat is spaced apart from the disk by a distance, and, in the state of the disk being in contact with the stopper, the disk is pressed by the stopper toward the rubber seat and the metal seat to be in contact with the rubber seat and the metal seat, and the disk, the rubber seat and the metal seat are positioned in a way that the flow of the fluid presses the disk toward the rubber seat when the disk closes the passage.

5. The multi-seal knife gate valve according to claim 4, wherein the rubber seat is an O-ring.

6. The multi-seal knife gate valve according to claim 4, wherein the rubber seat is further protruded towards the disk relative to the metal seat.

* * * * *